United States Patent
Anderson et al.

(10) Patent No.: US 7,257,503 B1
(45) Date of Patent: Aug. 14, 2007

(54) METHOD FOR RECALIBRATING A MATERIAL ATTRIBUTE MONITOR FOR A MOBILE VEHICLE

(75) Inventors: Noel Wayne Anderson, Fargo, ND (US); Mark William Stelford, Sycamore, IL (US); Stephen Michael Faivre, Kingston, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/348,866

(22) Filed: Feb. 7, 2006

(51) Int. Cl.
*G01D 18/00* (2006.01)
*G06F 19/00* (2006.01)

(52) U.S. Cl. .................. 702/85; 56/10.2 B; 56/10.2 H; 702/129

(58) Field of Classification Search .................. 702/85, 702/94, 100, 101, 102, 129; 73/1.16, 861.73; 56/10.2 B, 10.2 H; 356/432; 426/231
See application file for complete search history.

(56) References Cited

U.S. PATENT DOCUMENTS

| | | | |
|---|---|---|---|
| 6,820,459 B2 | 11/2004 | Beck et al. | ............... 73/1.16 |
| 6,983,217 B2 | 1/2006 | Moore | ......................... 702/129 |
| 7,073,314 B2 * | 7/2006 | Beck et al. | ............... 56/10.2 B |

OTHER PUBLICATIONS

Pierce, F. et al. "Yield Mapping." in: The State of Site Specific Management for Agriculture, 1997, (ASA/CSSA/SSSA, 1Library of Congress registration 97-7 1149) pp. 211-243.

* cited by examiner

*Primary Examiner*—John Barlow
*Assistant Examiner*—John Le

(57) ABSTRACT

A method for recalibrating a material attribute monitor for a mobile vehicle includes accumulating an aggregate amount of material from a plurality of material transfers; accumulating a plurality of material attribute data sets via a series of data transfers from at least one vehicle to another vehicle, wherein each material attribute data set of the plurality of material attribute data sets is associated with a corresponding material transfer of the plurality of material transfers; measuring aggregate material attributes of the aggregate amount of material; and generating material attribute calibration data from the accumulated plurality of material attribute data sets and the measured aggregate material attributes.

10 Claims, 5 Drawing Sheets

METHOD FOR RECALIBRATING A MATERIAL ATTRIBUTE MONITOR FOR A MOBILE VEHICLE

FIELD OF THE INVENTION

The present invention relates to monitoring material attributes, and more particularly, to a method for recalibrating a material attribute monitor for a mobile vehicle.

BACKGROUND OF THE INVENTION

One type of material attribute monitor is a grain yield monitor. Grain yield monitors require calibration to provide an accurate record of grain yield and moisture by location across a field. Calibration may be performed, for example, when field conditions change, such as when moving between fields. This involves operating the combine in the field while manually collecting yield monitor data, weighing the harvested grain on a scale, testing a sample for moisture content, and then applying a correction based on actual grain attributes versus the sum of those measured by the yield monitor. This approach has two major drawbacks.

First, this approach is a time consuming process that requires segregation of the grain by combine and manual recording of which data are associated with the grain used in the calibration process. In a word, the calibration procedure is inconvenient and consequently does not get done as often as it should. Furthermore, conditions may change within a field that should warrant a recalibration of the yield monitor. Given the difficulty of observing when recalibration should occur and the inconvenience of recalibrating, it just doesn't get done.

Second, on large scale farms, it is not unusual to have multiple combines, grain carts, and grain trucks simultaneously operating in a field at a given time. The grain co-mingles from different parts of the field as it moves from the field to the trucks. For example, a typical Illinois corn field is 80 acres in size with an average yield of 175 bushels per acre. The total amount of grain in the field is then 80*175=14,000 bushels. The combines have grain tanks of 100-200 bushel capacity. Grain carts typically receive the grain from the combines, and have a capacity typically in a range from 200-800 bushels. The grain carts then are unloaded into grain trucks. Grain trucks are typically limited to 20,000 pounds/axel, so a four axel truck would have a maximum weight of 80,000 pounds of which 20,000 are the truck itself. Corn weighs about 60 lbs/bushel, so the truck can carry 60,000 pounds or about 1000 bushels of corn. Thus, 14 truckloads of corn need to be transported from the field.

Accordingly, providing segmentation of the grain for calibration purposes by combine, grain cart, and truck has been found to be inconvenient, and inefficient.

SUMMARY OF THE INVENTION

The invention, in one form thereof, is directed to a method for recalibrating a material attribute monitor for a mobile vehicle. The method includes accumulating an aggregate amount of material from a plurality of material transfers; accumulating a plurality of material attribute data sets via a series of data transfers from at least one vehicle to another vehicle, wherein each material attribute data set of the plurality of material attribute data sets is associated with a corresponding material transfer of the plurality of material transfers; measuring aggregate material attributes of the aggregate amount of material; and generating material attribute calibration data from the accumulated plurality of material attribute data sets and the measured aggregate material attributes.

The invention, in another form thereof, is directed to a method for recalibrating a grain attribute monitor for a combine. The method includes monitoring grain attributes of harvested grain; monitoring each transfer of the harvested grain that contributes to an aggregate amount of grain loaded into a grain transfer vehicle; generating a grain attribute data set associated with the each transfer of the harvested grain; accumulating a plurality of grain attribute data sets via a series of data transfers, said plurality of grain attribute data sets corresponding to the harvested grain and each transfer of the harvested grain; measuring aggregate grain attributes of the aggregate amount of grain; and generating grain attribute calibration data from the accumulated plurality of grain attribute data sets and the measured aggregate grain attributes.

DETAILED DESCRIPTION OF THE INVENTION

Figure 1:
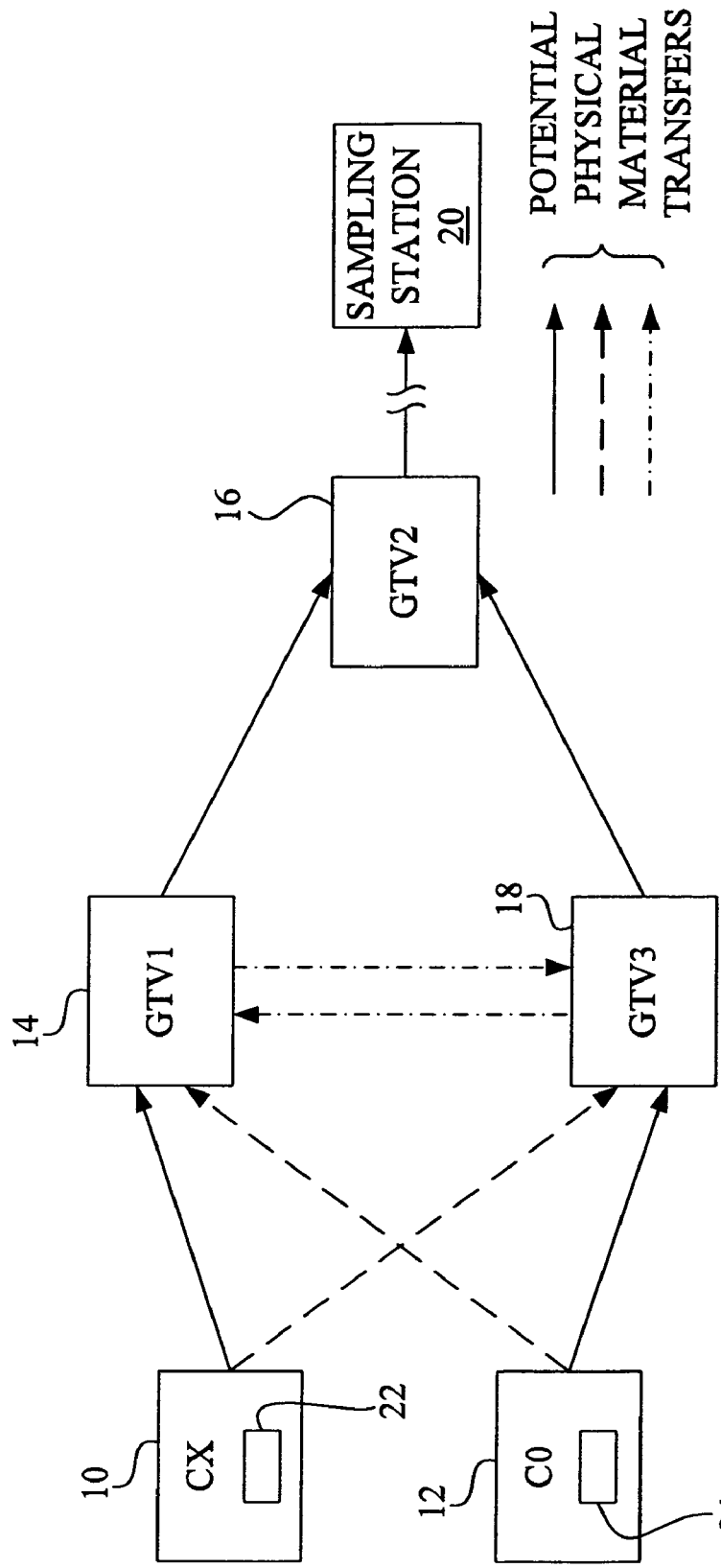
FIG. 1 is an exemplary material transfer diagram.

FIG. 1 is an exemplary material, e.g., grain, transfer diagram for a given area, e.g., a field, represented by mobile harvesting vehicles 10 and 12, e.g., a first combine CX and a second combine C0; a first material transfer vehicle 14, e.g., a grain transfer vehicle GTV1; a second material transfer vehicle 16, e.g., a grain transfer vehicle GTV2; a third material transfer vehicle 18, e.g., a grain transfer vehicle GTV3, and a sampling station 20.

In the example of FIG. 1, grain transfer vehicles GTV1, GTV2 and GTV3 may be grain carts, trucks, or a combination thereof. Sampling station 20 may be, for example, a farmer's work site, e.g., a grain bin, or a commercial material collection and distribution center, e.g., a commercial grain elevator. In the example of FIG. 1, potential physical material, e.g., grain, transfers are represented by solid arrows, dashed arrows and dash-dotted arrows, which are used for convenience to demonstrate numerous alternative material transfer paths. The direction of material transfer is in the direction that a respective arrow points.

Each of combines CX and C0 include a corresponding material, e.g., grain, attribute monitor 22, 24, respectively, that generate a material, e.g., grain, attribute data set for each load, e.g., grain tank, of material, e.g., grain, harvested. Each grain attribute data set may include a plurality of data points, with each data point including data corresponding to, for example, one or more grain volume mass, moisture content, impurities, cracked seeds, protein, oil, starch, etc., for the particular grain tank load of grain being transferred. Each data point may be associated with geo-reference information, e.g., including a global positioning system (GPS)

location. Accordingly, the grain attribute data set includes the locations, e.g., longitude/latitude, where the grain was harvested.

As a more specific example, assume that the initial data generated by material, e.g., grain, attribute monitors 22 and 24 of combines CX and C0, respectively, is geo-referenced, such as by a latitude and longitude, from a GPS receiver. Also, assume that combine CX is operating in a field producing 200 bushels of corn per acre, and that combine CX has a 200 bushel grain tank and a 40 foot wide combine header, and is traveling at 3 miles per hour (about 176 sq ft harvested/second) and wherein one data point, i.e., one geo-referenced grain attribute data record, is generated per second. In this example, the grain attribute data set associated with the full load of grain in the grain tank of combine CX will have about 248 data points.

Co-mingling of material transfers, e.g., grain transfers, occurs, for example, any time that one of the grain transfer vehicles GTV1, GTV2 and GTV3 receives grain from multiple sources. For example, each of grain transfer vehicles GTV1 and GTV3 may receive grain from combines CX and C0. Further, an intermediate transfer of grain may occur between grain transfer vehicles GTV1 and GTV3. Likewise, grain transfer vehicle GTV2 may receive grain transferred from grain transfer vehicles GTV1 and GTV3. Accordingly, one or more grain attribute data sets may be transferred each time grain is transferred from one vehicle to another.

Figure 2:
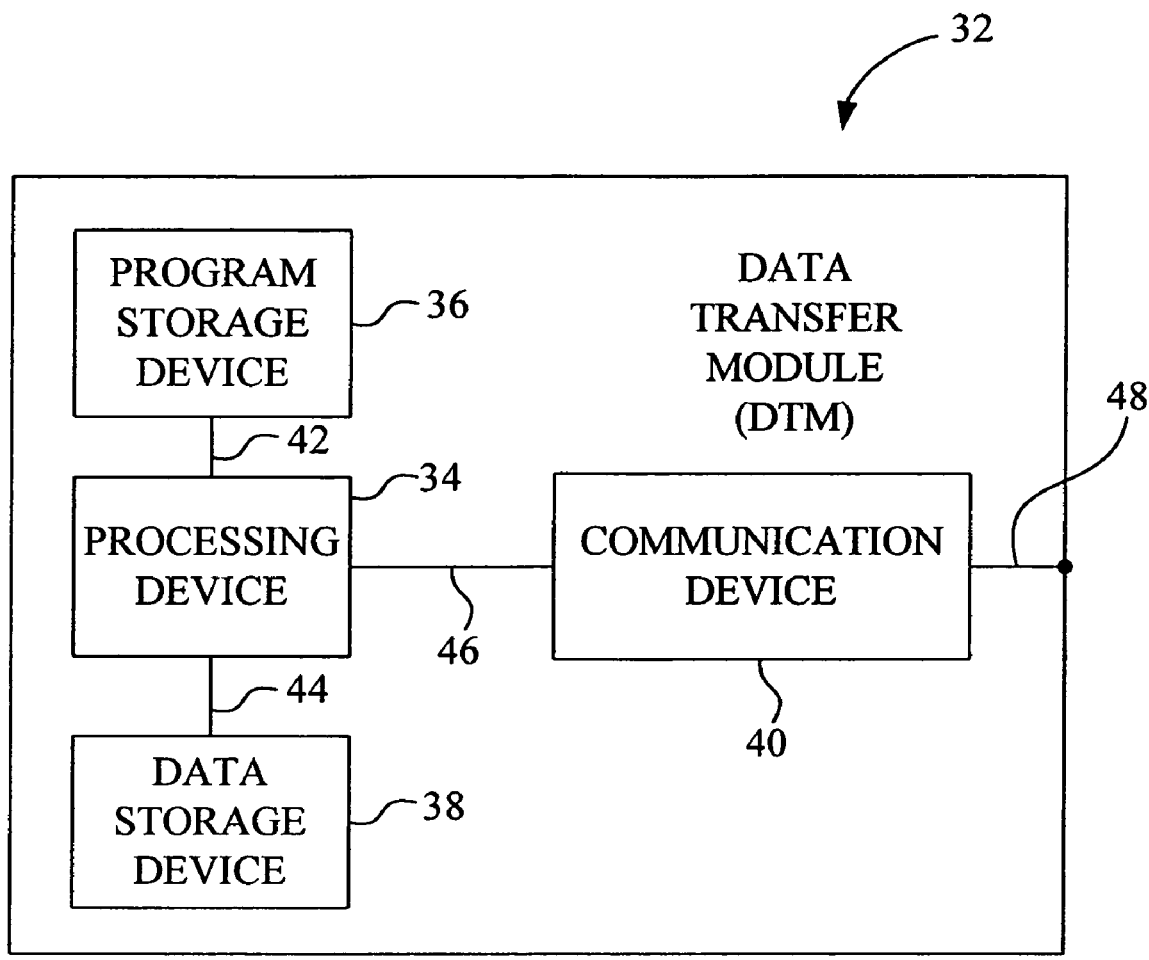
FIG. 2 is a block diagram of a data transfer module for use in practicing a method of the present invention.

Referring to FIG. 2, in order to keep track of grain attribute data sets, a data transfer module 32 may be incorporated into material attribute monitors 22, 24 of combines CX and C0, and provided at each grain transfer vehicle GTV1, GTV2 and GTV3, and at sampling station 20. Data transfer module 32 may be, for example, a computer, and includes a processing device 34, a program storage device 36, a data storage device 38, and a communication device 40. Processing device 34 is communicatively coupled to program storage device 36, data storage device 38, and communication device 40 via communication links 42, 44, and 46, respectively. Communication links 42, 44, and 46 may be established, for example, by a direct cable or bus connection, or wireless connection.

Program storage device 36 stores the program instructions used for operating data transfer module 32. Processing device 34 includes a microprocessor and associated memory for executing the program instructions retrieved from program storage device 36. Typical instruction sequences establish communication links with one or more other data transfer modules via communication device 40, identify and authenticate the other module, and manage data transfer to/from data storage device 38, including error detection and correction (e.g., resending a set of data upon notification of a failure), as well as optional encryption.

Communication device 40 is configured for bi-directional communication, and includes a transmission link 48, with an antenna, that facilitates wireless communication with an external device, such as a combine grain attribute monitor, or another data transfer module. Communication device 40 may operate, for example, using short range wireless technology (e.g., Bluetooth or IEEE 802.11) or long range wireless technology (e.g., cell phone). Communication device 40 may alternatively be in the form of a removable storage device, such as a USB memory stick, compact flash card, or other portable storage device which is physically moved to transfer data.

Figure 3:
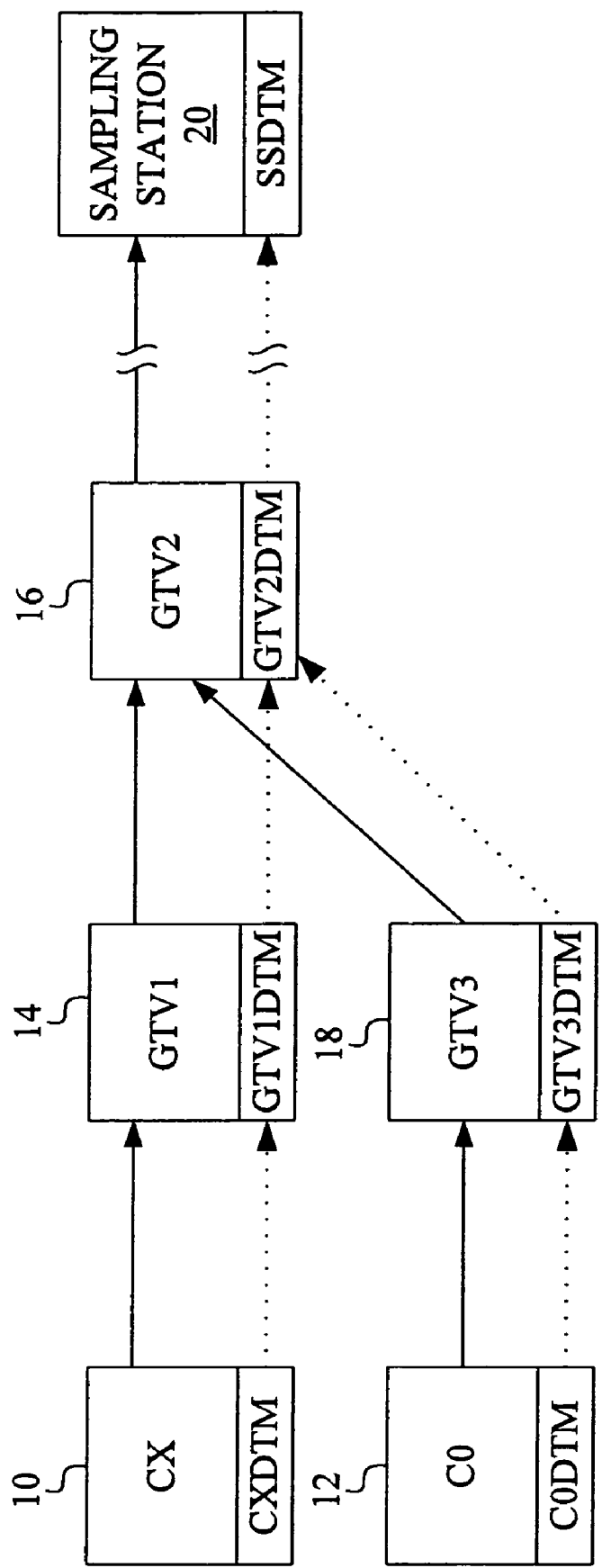
FIG. 3 is a diagrammatic representation of material attribute data transfers in accordance with one embodiment of the present invention.

In one embodiment, illustrated in FIG. 3, a plurality of the data transfer modules 32, individually identified as CXDTM, C0DTM, GTV1DTM, GTV2DTM, and GTV3DTM, may be used to cascade data from one vehicle to a receiving vehicle, e.g., combine to grain cart to truck, and ultimately to data transfer module SSDTM of sampling station 20. In another embodiment, illustrated in FIG. 4, the plurality of the data transfer modules 32, individually identified as CXDTM, C0DTM, GTV1DTM, GTV2DTM, GTV3DTM and SSDTM, may be used to send the data directly to a central data repository 50. Central data repository 50 may be, for example, a computer having a microprocessor with associated memory for providing processing capability, and serves as a location where the accumulated data is concentrated for grain tracking and recalibration. Those skilled in the art will recognize that variants of these two data transfer approaches may be used, in accordance with the principles of the present invention. The embodiments illustrated in FIGS. 3 and 4 will be discussed in more detail below.

Figure 5:
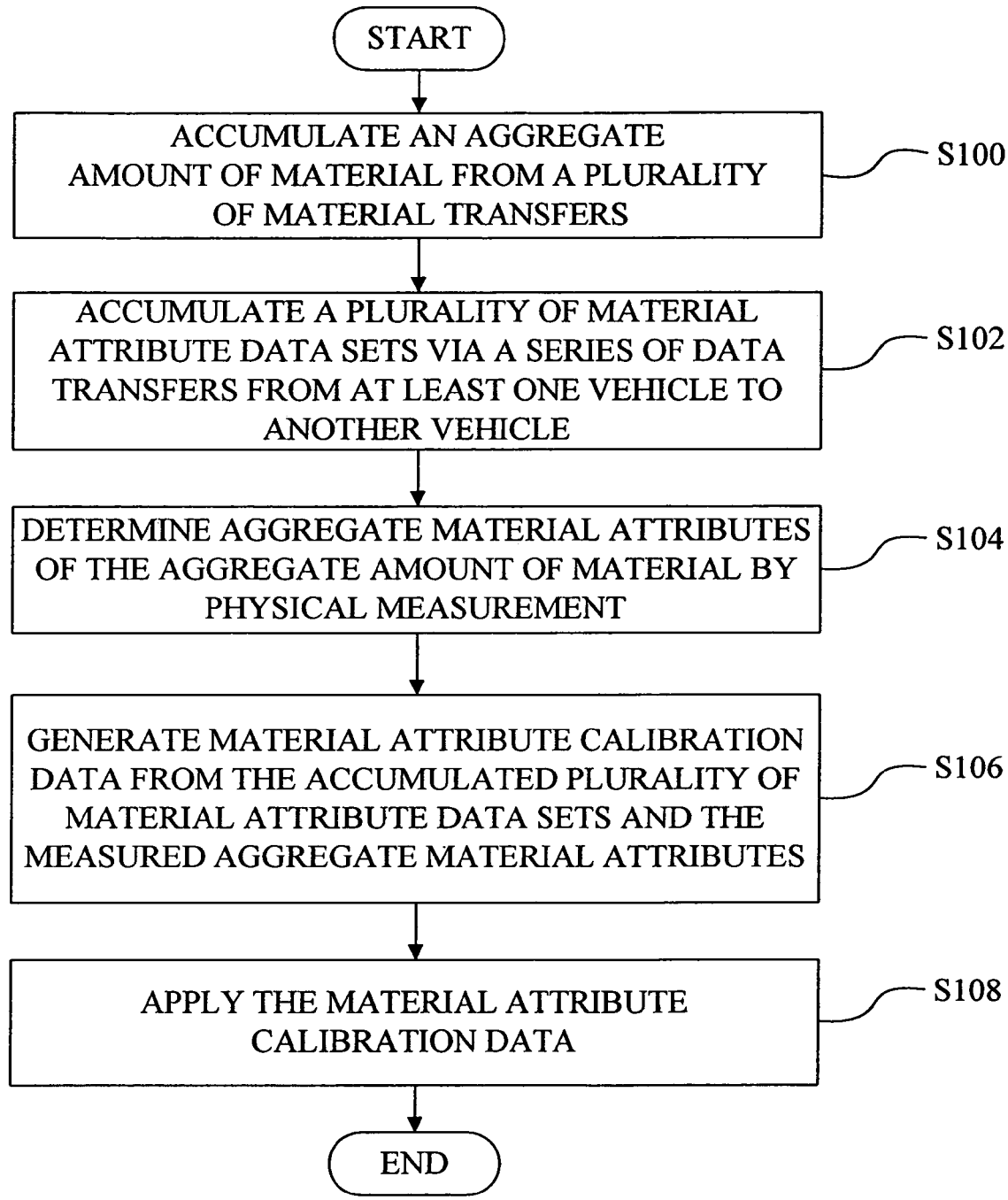
FIG. 5 is a flowchart of an exemplary method for recalibrating a material attribute monitor for a mobile vehicle.

Referring to FIG. 5, there is shown an exemplary method for recalibrating a material attribute monitor for a mobile vehicle, in accordance with an embodiment of the present invention.

Figure 4:
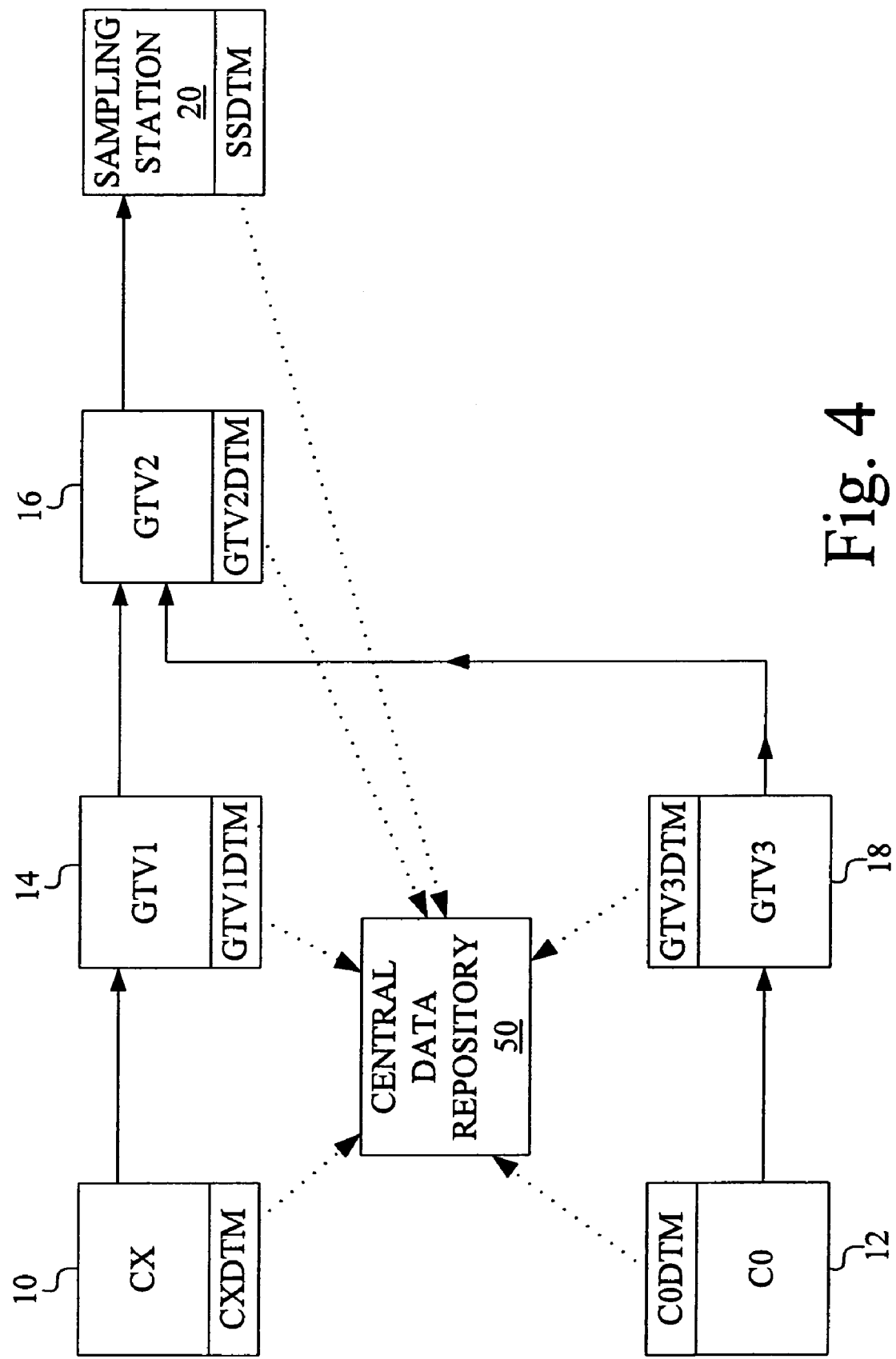
FIG. 4 is a diagrammatic representation of material attribute data transfers in accordance with another embodiment of the present invention.

At step 100, an aggregate amount of material from a plurality of material transfers is accumulated. As shown in FIGS. 1, 3 and 4, for example, grain transfer vehicle GTV2, such as a truck, receives the aggregate amount of material, e.g., grain, formed by a plurality of grain tank loads of grain supplied by one or both of combines CX and C0, the material transfer being represented by solid arrows. Grain transfer vehicles GTV1 and/or GTV3, such as grain carts, may provide transfer of the grain to grain transfer vehicle GTV2. Grain transfer vehicle GTV2 then transfers the aggregate amount of grain to sampling station 20, such as a grain bin or grain elevator.

At step S102, a plurality of material attribute data sets is accumulated via a series of data transfers from at least one vehicle to another vehicle.

Consider the example where the material is grain and each material attribute data set is a grain attribute data set. Each grain attribute data set of a plurality of grain attribute data sets is associated with a corresponding grain transfer of the plurality of grain transfers. Each grain attribute data set may include a plurality of data points, with each data point including data corresponding to, for example, one or more of grain volume mass, moisture content, impurities, cracked seeds, protein, oil, starch, etc., for the particular grain tank load of grain being transferred. Each data point may be associated with geo-reference information, e.g., including a global positioning system (GPS) location. Accordingly, each grain attribute data set includes the locations, e.g., longitude/latitude, where the grain was harvested.

FIGS. 3 and 4 illustrate two embodiments representing the operations of steps S100 and S102. Those skilled in the art will recognize that hybrids of these two embodiments may also be implemented.

In the embodiment illustrated in FIG. 3, each of combine CX, combine C0, grain transfer vehicle GTV1, grain transfer vehicle GTV2, grain transfer vehicle GTV3, and sampling station 20 includes a respective data transfer module (DTM), such as data transfer module 32 illustrated in FIG. 2, individually identified as CXDTM, C0DTM, GTV1DTM, GTV2DTM, GTV3DTM and SSDTM, respectively. In this example, the physical grain transfer is represented by solid arrows and the associated data transfer is represented by dotted arrows.

In the embodiment illustrated in FIG. 3, data is transferred to follow the physical material, i.e., grain transfer from vehicle to vehicle using, for example, a short range wireless communications. Optionally, before grain and data is transferred, the receiving vehicle may be required to identify and authenticate itself. Identification and authentication may make use of RFID tags. As grain is transferred to the receiving vehicle, the data associated with the grain is also transferred. When data is aggregated on the truck which goes to sampling station 20, e.g. the elevator, for weighing and sampling, the grain data on the truck's data transfer module is associated with the elevator data.

Several options exist for this step. For example, the data on the truck may be transferred to a wireless access point at the sampling station 20, e.g., elevator, where it is electronically combined with elevator data and forwarded to where it will be stored and analyzed. As another example, the elevator data may be downloaded to the truck for combination with the load data, and the combined load/elevator data may be transferred from the truck wirelessly or with a data storage device to where it will be analyzed. Also, the elevator data may be on a piece of paper and later manually combined with the truck data via a keyboard entry.

Combine CX and combine C0 may each include, for example, yield, moisture, and other crop attribute sensors associated with material attribute monitors 22, 24. The sensors are typically mounted on the clean grain elevator that deposits newly harvested grain on top of the grain that is in the combine grain tank. There is a delay, e.g., about 10 seconds, between grain entering the combine header and the yield or other attribute measurement that is being made. An estimated compensation for this delay may be made, if desired. Once the grain enters the grain tank, it is spread out over the grain preexisting in the grain tank.

As illustrated in FIG. 3, the grain attribute data sets cascade from one data transfer module (DTM) to the next DTM in succession to follow the physical grain transfer from one vehicle to the next. More particularly, as shown in the example of FIG. 3, combine CX transfers a grain tank of grain to grain transfer vehicle GTV1 and transfers the corresponding grain attribute data set from data transfer module CXDTM to data transfer module GTV1DTM. This process is repeated for each grain tank of grain that combine CX transfers to grain transfer vehicle GTV1. Likewise, combine C0 transfers a grain tank of grain to grain transfer vehicle GTV3 and transfers the corresponding grain attribute data set from data transfer module C0DTM to data transfer module GTV3DTM. This process is repeated for each grain tank of grain that combine C0 transfers to grain transfer vehicle GTV3.

Ideally, all the grain in the grain tank is emptied into the grain transfer vehicle, e.g., grain cart, each time a transfer is made. However, typically this is the exception rather than the rule. Detailed modeling of grain entering the combine grain tank on top and leaving through the auger at the bottom is a difficult bulk material flow problem. Thus, a simple First-In-First-Out (FIFO) assumption for grain and its associated data may be utilized. If a model and processing mechanism to run the model are available, they can be used in place of the FIFO assumption. A measurement device on the combine auger (e.g., auger mass flow sensor) or in the grain cart (e.g., a bulk material volume sensor) may be used to measure the amount of grain that is transferred, and the data associated with the transferred grain may be appended to the corresponding grain attribute data set to generate a new grain attribute data set, or a separate grain attribute data set specific to the present grain transfer may be generated.

Grain transfer vehicle GTV1 later transfers its accumulated grain to grain transfer vehicle GTV2, such as a grain truck, e.g., semi-tractor trailer, and data transfer module GTV1DTM transfers its accumulated grain attribute data sets to data transfer module GTV2DTM. Again, the ideal case is that the whole grain load is loaded into the grain truck. However, again this case may be the exception. A mechanism for measuring the amount of grain transferred on the grain cart auger (e.g., auger mass flow sensor) or in the grain truck bed (e.g., a bulk material volume sensor) may be used to monitor the grain transfer. A material flow assumption such as FIFO, or a more detailed bulk material flow model, may be used to identify the grain transferred from grain transfer vehicle GTV1 to the grain transfer vehicle GTV2. The data associated with the transferred grain may be appended to the corresponding grain attribute data sets, or a separate grain attribute data set specific to the present grain transfer may be generated.

Likewise, grain transfer vehicle GTV3 later transfers its accumulated grain to grain transfer vehicle GTV2, and data transfer module GTV3DTM transfers its accumulated grain attribute data sets to data transfer module GTV2DTM. Data transfer module GTV2DTM now has the total accumulated grain attribute data sets for the aggregate amount of grain loaded in grain transfer vehicle GTV2, e.g., a truck. A material flow assumption such as FIFO, or a more detailed bulk material flow model, may be used to identify the grain transferred from grain transfer vehicle GTV3 to the grain transfer vehicle GTV2. The data associated with the transferred grain may be appended to the corresponding grain attribute data sets, or a separate grain attribute data set specific to the present grain transfer may be generated.

Grain transfer vehicle GTV2 later delivers, e.g., transfers, its load of accumulated grain to sampling station 20, such as at a farmer's work site, e.g., grain bin, or at a commercial grain elevator. Also, data transfer module GTV2DTM transfers the total accumulated grain attribute data sets for the aggregate amount of grain loaded in grain transfer vehicle GTV2 to data transfer module SSDTM of sampling station 20.

Not all grain goes directly from a field to the elevator or other location for weighing and sampling. This other grain typically goes to a grain bin. This step can be handled much as the case of the grain cart, i.e., grain goes on top of material already present. Typically, grain is removed from the bottom in a measured fashion, such as by using an auger mass flow sensor. A simple model, such as FIFO, or a more complex bulk material flow model, may be used to identify grain and its data which is being transferred from the bin to a truck for transport to an elevator.

In the embodiment of FIG. 4, the physical grain transfers are the same as described above with respect to the embodiment of FIG. 3. The physical grain transfers are represented by solid arrows and the associated data transfer is represented by dotted arrows. However, in this embodiment, each time the grain is transferred, the associated grain attribute data sets are transferred to the central data repository 50. In other words, this embodiment does not use inter-vehicle communications; but instead, uses time and/or location stamping of transfer actions. For example, geo-referenced data is collected about the harvested grain. The grain goes into the grain tank on the combine. When a grain cart comes along, the combine records the transfer of the number of bushels of grain at a given time and/or location interval. The grain cart records receipt of grain (amount unknown) at a given time and/or location interval. When grain is transferred from the grain cart to truck, the grain cart records a number of bushels of grain that are transferred at a given time and/or location interval. The truck records receipt of grain (amount unknown) at a given time and/or location interval.

Each of the transfer records is either sent to central data repository 50 using long range wireless communication, or alternatively, may be delivered to central data repository 50 via a portable data storage device and downloaded. Once all the transaction data is together, a material flow model such as a FIFO or a more detailed bulk material flow model may be used to identify the grain transferred from the combine to the grain cart, and which grain cart it was, based on the time and/or location of the transfer. Each transfer of the grain is tracked in a similar manner.

At step S104, aggregate material attributes of the aggregate amount of material are determined by physical measurement. For example, for each truck load of grain, aggregate grain attributes (e.g., one or more of grain volume mass, moisture content, impurities, cracked seeds, protein, oil, starch, etc.) may be determined through load sampling and sample analysis. This load sampling and sample analysis may occur, for example, at grain sampling station 20, which may be, for example, at the farmer's work site or at a commercial grain elevator. The aggregate grain attributes, for example, may be represented as an electronic record, or a written record.

At step S106, material attribute calibration data is generated from the accumulated plurality of material attribute data sets of step S102 and the measured aggregate material attributes of the aggregate amount of material determined at step S104. In the embodiment of FIG. 3, for example, data transfer module SSDTM may execute program instructions for generating the material attribute calibration data. In the embodiment of FIG. 4, for example, central data repository 50 may execute program instructions for generating the material attribute calibration data.

Again, consider the example where the material is grain and each material attribute data set is a grain attribute data set. In implementing step S106, equations and constraints are generated for one or more truckloads of grain, carried for example by grain transfer vehicle GTV2, generated by one or more combines CX, C0. As an example, consider the bushels of grain in two truckloads harvested by two combines CX and C0. Each grain yield monitor, i.e., sensor, has a calibration factor associated with it for each load. Thus:

$Y(\text{truckload 1}) = \Sigma(\text{combine } C0 \text{ yield data set 1})^* y(C01) + \Sigma(\text{combine } CX \text{ yield data set 1})^* y(CX1)$ (Equation 1)

$Y(\text{truckload 2}) = \Sigma(\text{combine } C0 \text{ yield data set 2})^* y(C02) + \Sigma(\text{combine } CX \text{ yield data set 2})^* y(CX2)$ (Equation 2)

where:
Y(truckload 1) is the total yield for the truckload 1;
Y(truckload 1) is the total yield for the truckload 2;
y(C01) is the yield calibration factor for combine C0 for truckload 1
y(CX1) is the yield calibration factor for combine CX for truckload 1
y(C02) is the yield calibration factor for combine C0 for truckload 2; and
y(CX2) is the yield calibration factor for combine CX for truckload 2.

Accordingly, there are two equations with four unknowns: y(C01), y(CX1), y(C02), and y(CX2) and the two equations have an infinite number of solutions. Also, the grain attribute data sets and grain from a combine going into a truck load may not be contiguous. For example, in three contiguous harvest segments for a combine, the grain from the first segment may go to a first grain cart to a first truck. The grain from the second segment may go to a second grain cart to a second grain truck. The grain from the second segment may go to the first grain cart and then to the first grain truck. Thus, many permutations are possible in the path from the combine to a grain truck to form a truck load.

In this example, the similitude of context for the grain making up the two truckloads (crop variety, soil conditions, moisture conditions, etc.) is considered close enough that it can be assumed that y(C01)=y(C02) and that y(CX1)=y(CX2). There are now two equations and two unknowns which are easily solved using algebra:

$Y(\text{truckload 1}) = \Sigma(\text{combine } C0 \text{ yield data set 1})^* y(C0) + \Sigma(\text{combine } CX \text{ yield data set 1})^* y(CX)$ (Equation 3)

$Y(\text{truckload 2}) = \Sigma(\text{combine } C0 \text{ yield data set 2})^* y(C0) + \Sigma(\text{combine } CX \text{ yield data set 2})^* y(CX)$ (Equation 4)

The number of separate contexts and methods of solving for calibration constants for those contexts will grow as experience with the invention across crops and conditions grows.

At step S108, the material attribute calibration data, e.g., calibration factors, is applied, for example, to calibrate a material attribute monitor, e.g., material attribute monitor 22 and/or 24, such as a combine's grain attribute (e.g., yield) monitor, and/or to calibrate a grain attribute (e.g., yield) map of the region of interest, e.g., a field. For example, the calibration constants may be used as inputs to a computer to adjust individual data for grain yield and other attributes used to generate field maps of those attributes for the region of interest by the computer. The material attribute calibration data may be transferred to the material attribute monitor, for example, via a wireless communication link, e.g., from data transfer module SSDTM or central data repository 50; from a wired connection, e.g., from a data transfer module DTM via a communication cable; or alternatively, via a portable memory device.

With the method described above, material attribute monitor recalibration may be performed automatically for material attribute monitor recalibration and/or field mapping of grain attributes, and may be performed on a "per truck load" frequency, in contrast to a "per grain tank" frequency. Also, the method supports multiple, as well as single, harvesting vehicles, e.g., combines, and multiple material transport vehicles, e.g., grain carts, and trucks.

Those skilled in the art will recognize the principles of the invention described above with respect to a specific embodiment wherein the material being transferred is grain may be readily applied to the harvesting of other materials, such as for example, and not by way of limitation, cotton, alfalfa/grass, sugar cane/beets, root crops, fruits and vegetables, saw logs, soil, etc.

For example, in applications where the material is cotton, each material attribute data set may include a plurality of data points, with each data point including data corresponding to, for example, one or more of mass and impurities. In applications where the material is alfalfa/grass, each material attribute data set may include a plurality of data points, with each data point including data corresponding to, for example, one or more of mass, moisture, and protein. In applications where the material is sugar cane/beets, each material attribute data set may include a plurality of data points, with each data point including data corresponding to, for example, one or more of mass, moisture, and sugar content. In applications where the material is root crops, each material attribute data set may include a plurality of data points, with each data point including data corresponding to, for example, one or more of mass, tare dirt, and rocks. In applications where the material is fruits or vegetables, each material attribute data set may include a plurality of data points, with each data point including data corresponding to, for example, one or more of mass, temperature, ripeness, diameter, and bruising. In applications where the material is saw logs, each material attribute data set may include a plurality of data points, with each data point including data corresponding to, for example, one or more of diameter and length. In applications where the material is soil, each material attribute data set may include a plurality of data points, with each data point including data corresponding to, for example, one or more of mass, and contaminants such as hydrocarbons, radiation, etc. In each of these applications, each material attribute data set includes the locations, e.g., longitude/latitude, where the material was harvested.

Having described the preferred embodiment, it will become apparent that various modifications can be made without departing from the scope of the invention as defined in the accompanying claims.

The invention claimed is:

1. A method for recalibrating a material attribute monitor for a mobile vehicle, comprising:
   accumulating an aggregate amount of material from a plurality of material transfers;
   accumulating a plurality of material attribute data sets via a series of data transfers from at least one vehicle to another vehicle, wherein each material attribute data set of said plurality of material attribute data sets is associated with a corresponding material transfer of said plurality of material transfers;
   measuring aggregate material attributes of said aggregate amount of material;
   generating material attribute calibration data from the accumulated plurality of material attribute data sets and the measured aggregate material attributes; and
   recalibrating the material attribute monitor using the material attribute calibration data, wherein said plurality of material transfers includes a plurality of initial material transfers from at least one material harvesting vehicle to a first material transfer vehicle, and at least one supplemental material transfer by said first material transfer vehicle to a second material transfer vehicle.

2. The method of claim 1, wherein:
   with said plurality of initial material transfers from said at least one harvesting vehicle to said first material transfer vehicle, each corresponding material attribute data set of said plurality of material attribute data sets is transferred to a first data transfer module on said first material transfer vehicle; and
   with said at least one supplemental material transfer by said first material transfer vehicle to said second material transfer vehicle, each corresponding material attribute data set of said plurality of material attribute data sets in said first data transfer module is transferred to a second data transfer module on said second material transfer vehicle.

3. The method of claim 2, wherein each of said first material transfer vehicle and said second material transfer vehicle is one of a material cart and a truck.

4. The method of claim 2, wherein:
   said plurality of material transfers includes an additional material transfer from said second material transfer vehicle to a sampling station; and
   with said material transfer from said second material transfer vehicle to said sampling station, each of said plurality of material attribute data sets in said second data transfer module is transferred to a third data transfer module at said sampling station.

5. The method of claim 4, wherein said sampling station is one of a work site and a commercial material collection and distribution center.

6. The method of claim 4, wherein said measuring aggregate material attributes of said aggregate amount of material occurs at said sampling station.

7. A method for recalibrating a material attribute monitor for a mobile vehicle, comprising:
   accumulating an aggregate amount of material from a plurality of material transfers;
   accumulating a plurality of material attribute data sets via a series of data transfers from at least one vehicle to another vehicle, wherein each material attribute data set of said plurality of material attribute data sets is associated with a corresponding material transfer of said plurality of material transfers;
   measuring aggregate material attributes of said aggregate amount of material;
   generating material attribute calibration data from the accumulated plurality of material attribute data sets and the measured aggregate material attributes; and
   recalibrating the material attribute monitor using the material attribute calibration data, wherein each receiver of a material transfer contributing to said plurality of material transfers includes a data transfer module, wherein with each successive material transfer of said plurality of material transfers each previously generated material attribute data set of said plurality of material attribute data sets associated with said each successive material transfer is transferred in a cascading fashion to a next data transfer module on a material transfer vehicle that receives said material transfer.

8. A method for recalibrating a grain attribute monitor for a combine, comprising:
   monitoring grain attributes of harvested grain;
   monitoring each transfer of said harvested grain that contributes to an aggregate amount of grain loaded into a grain transfer vehicle;
   generating a grain attribute data set associated with said each transfer of said harvested grain;
   accumulating a plurality of grain attribute data sets via a series of data transfers, said plurality of grain attribute data sets corresponding to said harvested grain and said each transfer of said harvested grain;
   measuring aggregate grain attributes of said aggregate amount of grain;
   generating grain attribute calibration data from the accumulated plurality of grain attribute data sets and the measured aggregate grain attributes; and
   recalibrating the grain attribute monitor using the grain attribute calibration data, wherein each receiver of a grain transfer of at least a portion said harvested grain includes a respective data transfer module, wherein with each grain transfer of said plurality of grain transfers each previously generated grain attribute data set of said plurality of grain attribute data sets is transferred in a cascading fashion to the data transfer module on a corresponding grain transfer vehicle that receives said grain transfer.

9. The method of claim 8, wherein said each receiver is one of a grain cart, a truck, and a sampling station.

10. The method of claim 9, wherein said sampling station is one of a farmer's work site and a commercial grain elevator.

* * * * *